United States Patent [19]

Trifiletti

[11] Patent Number: 4,969,289
[45] Date of Patent: Nov. 13, 1990

[54] GARDEN EDGING DEVICE

[76] Inventor: Carmen Trifiletti, 424 East Main St., Norristown, Pa. 19401

[21] Appl. No.: 393,982

[22] Filed: Aug. 15, 1989

Related U.S. Application Data

[63] Continuation of Ser. No. 257,646, Oct. 14, 1988.

[51] Int. Cl.$^5$ .............................................. A01G 1/00
[52] U.S. Cl. ......................................... 47/33; 52/102
[58] Field of Search .................. 47/33, 25, 32; 52/102

[56] References Cited

U.S. PATENT DOCUMENTS

| | | | |
|---|---|---|---|
| 1,666,613 | 4/1928 | Woods | 47/33 X |
| 1,916,494 | 7/1933 | Schrickel . | |
| 2,662,342 | 12/1953 | Peterson | 47/33 |
| 2,782,561 | 2/1957 | Smith | 47/25 |
| 2,842,344 | 7/1958 | Todd . | |
| 2,877,600 | 3/1959 | Slate | 47/33 |
| 2,912,792 | 11/1959 | Venable | 47/33 |
| 3,087,279 | 4/1963 | Thompson | 47/33 |
| 3,289,349 | 7/1966 | Valdez . | |
| 3,315,752 | 4/1967 | Pasquini . | |
| 3,332,197 | 7/1967 | Hinkle | 47/33 X |
| 3,491,660 | 1/1970 | Kwasney . | |
| 3,520,082 | 7/1970 | Smith | 47/33 |
| 3,545,127 | 12/1970 | Jensen . | |
| 3,559,338 | 2/1971 | Klingberg | 47/33 |
| 3,676,952 | 7/1972 | Watts . | |
| 3,713,624 | 1/1973 | Niemann . | |
| 3,724,128 | 4/1973 | Tabone . | |
| 3,777,421 | 12/1973 | Bomba . | |
| 4,372,079 | 2/1983 | Trageser . | |
| 4,702,034 | 10/1987 | Ferguson | 47/33 |

FOREIGN PATENT DOCUMENTS

| | | | |
|---|---|---|---|
| 467007 | 2/1969 | Canada | 47/33 |
| 3127920 | 1/1983 | Fed. Rep. of Germany | 47/33 |
| 2289109 | 10/1974 | France | 47/33 |
| 106744 | 8/1933 | Hungary | 47/33 |
| 1219 | 1/1907 | United Kingdom | 47/33 |
| 417724 | 10/1934 | United Kingdom | 47/33 |

OTHER PUBLICATIONS

Accent Curb of Florida, P.O. Box 9041, Port Charlotte, FL 33949, (813) 742-6307-Product Literature.
Newspaper Article of Unknown Origin Article Titled "Protect Trees; Eliminate Trimming Chores".
Kamb Raseneinfassung, No. 7526973, 1977.

Primary Examiner—Henry E. Raduaso
Attorney, Agent, or Firm—Frank M. Linguiti

[57] ABSTRACT

A garden edging device separates one area of a lawn from another. The edging device includes two upwardly facing generally flat elongated horizontal segements. Two elongated vertical segments, each integral with the first horizontal segment, depend downwardly from the first horizontal segment along the longitudinal edges of the horizontal segment. One of the elongated vertical segments is integral along its lower edge to one longitudinal edge of the second horizontal segment. An additional longitudinal vertical segment is integral with the second horizontal segment and depends downwardly from it. The upwardly facing segments are provided with recessed holes for receiving and countersinking the heads of stakes which secure the device to the ground. The device can be straight or curved and can be formed with folds permitting it to be bent.

2 Claims, 3 Drawing Sheets

GARDEN EDGING DEVICE

This is a continuation of application Ser. No. 07/257,646, filed Oct. 14, 1988.

BACKGROUND ART STATEMENT

1. Field of the Invention

This invention relates generally to lawn edging devices and in particular to a lawn edging device having an first upwardly facing surface for conveniently trimming grass in a region adjacent the edging device and a second upwardly facing surface disposed on a barrier extending above the surface of the ground for separating one area of a lawn from another.

2. Background of the Invention

Many lawn edging devices have been proposed previously for stopping the growth of grass and weeds at locations adjoining a sidewalk, building, flower bed, etc thereby separating the grass or weeds. Some of these previously proposed edging devices are very simple and serve merely to cover an area of ground and shield the area thereby preventing growth and providing a spacing.

Thus garden edging structures have long been used to confine soil within garden plots having plants, flowers and other forms of vegetation of plant life growing therein. Essentially such garden edging structures serve to identify garden plots and to separate the same from adjacent grass, vegetation and soil. Further, when such garden edging structures confine and maintain soil within the garden plot they prevent the confined soil from washing away.

Generally speaking many of these devices included some form of barrier made up of one or more edging units, each of which was a longitudinal member of non-frangible, preferably resilient, elastometric material such as molded rubber, plastic, or the like. Many were suitably reinforced with, for example, an inner core structure. Some edging devices were formed of metal, for example metal bands. Each edging unit could be provided with interlocking engagement means for coupling adjacent units to each other. Additionally, penetrating fastening elements where provided for pinning individual barrier units in a simple relationship on a ground surface in a desired configuration or position.

Many garden plots are surrounded by grass. A problem encountered with conventional garden edging structures is that of cutting grass extended directly adjacent the boundary structure surrounding such a garden plot or any other area bordered by grass. Because of the presence of the garden edging structure, one can not properly position a lawnmower to pass over the grass extending adjacent the garden plot boundary. Thus this grass is left uncut many times leaving a less than neat appearance. To properly cut this grass one would have to use a small hand cutter or, if available, a powered fling type cutter. Many people do not have access to such a fling type cutter and cutting with small scissor type cutters is laborious and time consuming.

Therefore some devices in the prior art had a horizontal portion disposed flat on the ground or near to the ground to provide a track for the wheel or wheels of a lawnmower. This permitted the cutting portion of the lawnmower to pass over the edge of the grass and to cut the grass at this edge. However many devices which had such a track failed to provide a substantial barrier between areas of a garden by providing a portion extending above the ground portion for confining materials on one side of the edging device. This confinement is very important when one type of soil is on one side and a different kind is on another side or where there are rocks or pebbles on one side which should be prevented from going to the other side. Additionally, such a barrier may be used to confine wood chips, raised mulch etc.

It is known in the prior art to provide garden edging devices in which units of the devices provide both a track for a lawnmower wheel as well as a substantial upwardly extending portion to separate two areas of ground. For example, see U.S. Pat. No. 3,289,349 issued to Valdez, and U.S. Pat. No. 4,372,079 issued to Trageser. However the units of both the garden edging device of Valdez and that of Trageser are formed of a plurality of subunits which must be combined to form a single unit of the edging device. The units formed by this combination may then be combined with each other to form the configuration required to border an area of a garden. This increases the labor and time required for installation of the edging devices of Valdez and Trageser The following are U.S. Patents which provide a track and somewhat raised separating or barrier portion: U.S. Pat. No. 3,777,421 issued to Bomba, U.S. Pat. No. 1,916,494 issued to Schrickel and U.S. Pat. No. 3,724,128 issued to Tabone.

SUMMARY OF THE INVENTION

A garden edging device separates one area of a lawn from another. The edging device includes two upwardly facing generally flat elongated horizontal segments. Two elongated vertical segments, each integral with the first horizontal segment, depend downwardly from the first horizontal segment along the longitudinal edges of the horizontal segment. One of the elongated vertical segment is integral along its lower edge to one longitudinal edge of the second horizontal segment. An additional longitudinal vertical segment is integral with the second horizontal segment and depends downwardly from it.

DETAILED DESCRIPTION OF THE INVENTION

Figure 1:
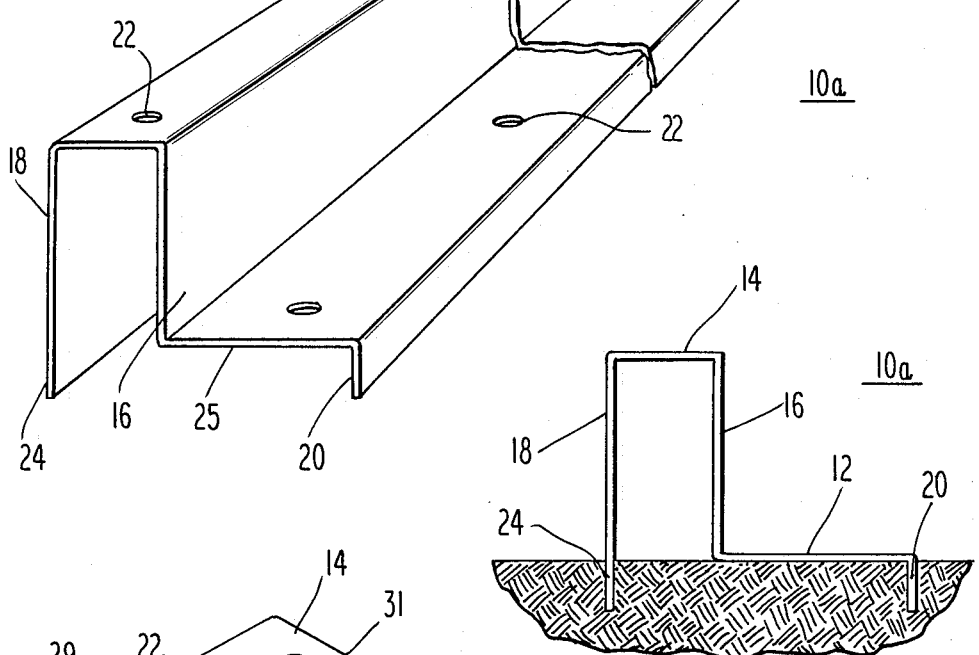
FIG. 1 shows a perspective view of a unit of the garden edging device of the present invention.
Figure 2:
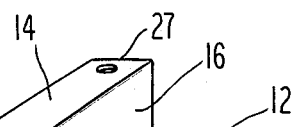
FIG. 2 shows a cross sectional view of the garden edging device of FIG. 1 wherein the garden edging device is installed in the ground.

Referring now to FIGS. 1, there is shown garden edging device 10a for separating one area of a lawn from another. Garden edging device 10a includes a first upwardly facing surface 12 and a second upwardly facing surface 14. Vertical segments 16, 18 of garden edging device 10a depend downwardly from upwardly facing surface 14. Vertical segment 20 or toe 20 depends downwardly from upwardly facing surface 12 which is joined to the bottom edge of vertical segment 16. All segments 12,14,16,18,20 are integral and formed of a unitary structure within a unit of edging device 10a. Device 10a may be formed of vinyl.

While segments 16, 18 and 20 are shown joined to surfaces 12, 14 at right angle corner, it will be understood that these joints may have a radius. Additionally it will be understood that edges 25, 27 of garden edging device 10a may be provided with male and female coupling means (not shown) in a conventional manner for coupling a plurality of units of edging device 10a to each other end to end. These coupling means may be, for example, flanges.

When garden edging device 10a is installed in the ground upwardly facing surface 12 prevents grass and weeds from growing in an area of the ground immediately adjacent vertical segment 16 and underneath upwardly facing surface 16. Thus the edge of the growth of weeds and grass is separated from the barrier portion of edging device 10a which extends upwardly above the ground. Upwardly facing surface 16 also provides a track for the wheel of a lawnmower and allows the cutting portion of the lawnmower to pass above the edge of the growth of the weeds and grass to permit a more thorough cutting of the weeds and grass. Vertical segments 16, 18 of garden edging device 10a in cooperation with upwardly facing segment 14 form an upwardly extending barrier when garden device 10a is installed in the ground whereby one area of lawn may be separated from another area of the lawn by a distance equal to the distance between vertical segments 16,18 or walls 16,18.

In order to install garden edging device 10a in the ground, and thereby construct this barrier, garden edging device 10a is disposed on the ground wherever positioning is desired. A spade is then used to dig a small, approximately one inch deep V-shaped ditch where toe 20 is disposed and another such ditch where portion 24 of vertical segment 18 is disposed. Vertical segment or toe 20, extending along the entire longitudinal distance of garden edging device 10a is placed into its V-shaped ditch and portion 24 is placed into its V-shaped ditch. Thus very little digging is required for the installation of garden edging device 10a. Alternately, edging device 10a may be positioned with no ditch and backfilling against edging device 10a may be performed. When garden edging device 10a is thus installed using either method, stakes (not shown) may be driven through holes 22 of garden edging device 10a to further secure garden edging device 10a. Holes 22 are formed with recesses for receiving and countersinking the heads of such stakes. The flatness of surfaces 12,14 thus permits the use of numerous stakes to secure device 10a while preventing the dangerous and unsightly protrusions of the heads above the surfaces because forming the surfaces flat rather than curved permits effective countersinking of stakes.

The height of vertical segment 18 of garden edging device 10a may be approximately seven inches, the height of vertical segment 16 may be approximately five and one-half to six inches and the height of vertical segment 20 or toe 20 may be approximately one to one and one-half inches. The width of horizontal segment 14 of edging device 10a may be approximately two to four inches and the width of horizontal segment 12 may be approximately four to five inches. Holes 22 may be one-half inch or larger with a three-quarter inch recess for countersinking the heads of stakes. If edging device is secured by backfilling the height of portion 24 and toe 20 may each be three inches.

Figure 3:
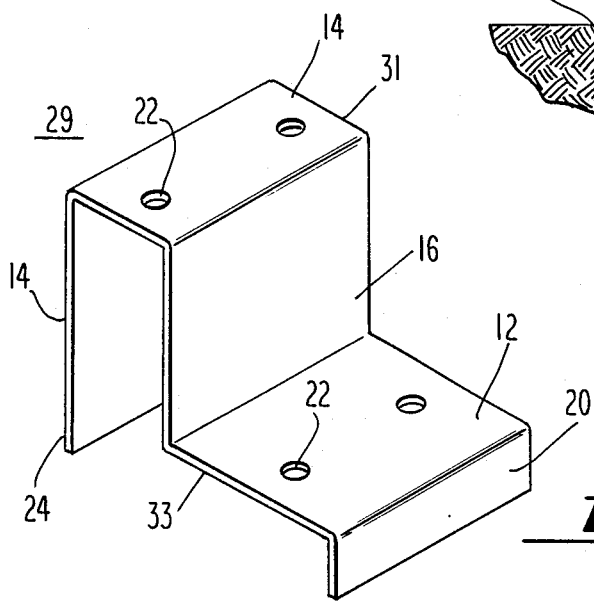
FIG. 3 shows a perspective view of a straight splice plate suitable for attachment to the garden edging device of FIG. 1.

Referring now to FIG. 3, there is shown straight splice plate 29. The cross-sectional shape of straight splice plate 29 is the same as that of garden edging device 10a. Thus, within straight splice plate 29 vertical segments 16, 18 depend downwardly from upwardly facing segment 14 and vertical segment 20 depends downwardly from upwardly facing segment 12. The cross-sectional dimensions of straight splice plate 29 can be greater that those of edging device 10a to permit units of edging device 10a to be matingly received underneath splice plate 29. Two units of garden edging device 10a may thus be joined together by straight splice plate 29.

To further secure units of garden edging device 10a thus joined by straight splice plate 29, one hole of straight splice plate 29 is lined up above an end most hole 22 of one unit of garden edging device 10a while the other hole 22 of straight splice plate 29 is positioned above an end most hole 22 of the the other unit of garden edging device 10a. Stakes (not shown) are then driven through holes 22 of straight splice plate 29 to further secure the two units of garden edging device 10a. The heads of the stakes are countersunk in the recesses of holes 22.

Figure 4:
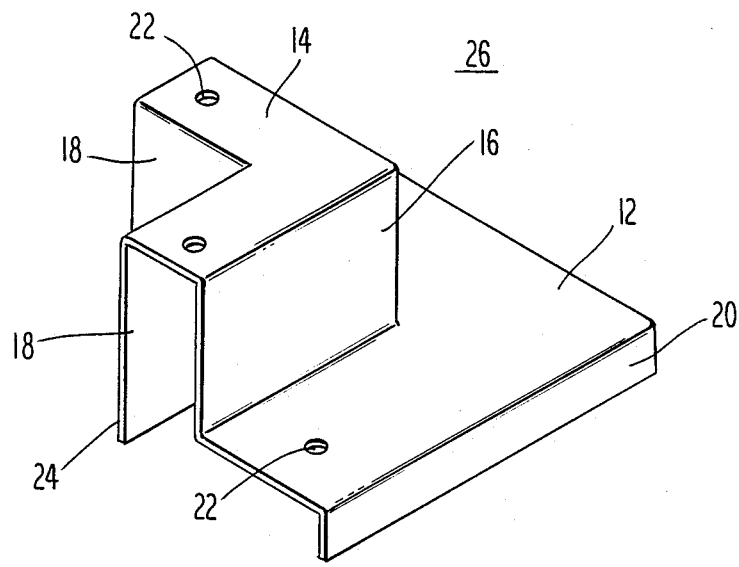
FIG. 4 shows an corner splice plate suitable for attachment to edging device of FIG. 1.

Referring now to FIG. 4 there is shown corner splice plate 26. Corner splice plate 26 has the same cross-sectional shape as garden edging device 10a and may be used to join two units of garden edging device 10a at a ninety degree angle with respect to each other in a manner similar to that described for the joining of straight splice plate 29. Thus to form a ninety degree angle with garden edging device 10a two units of garden edging device 10a are positioned at a right angle with respect to each other and splice plate 26 is positioned over them. Holes 22 of the units of edging device 10a and splice plate 26 are lined up and stakes are driven through holes 22.

Figure 5:
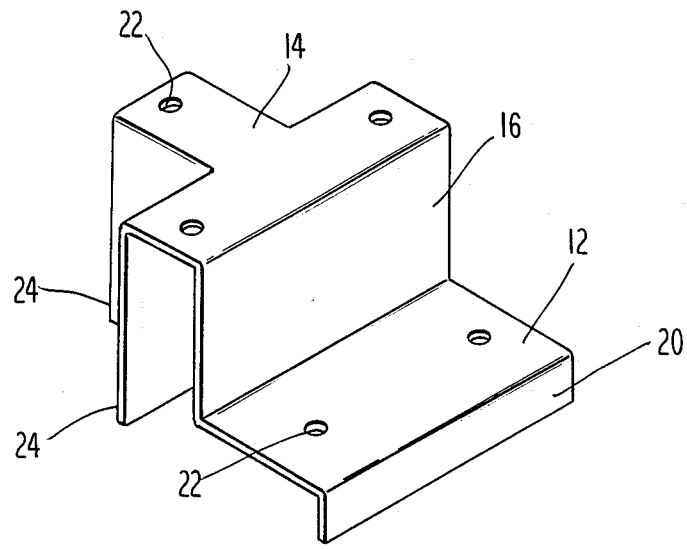
FIG. 5 shows a perspective view of a T-joint splice plate suitable for attachment to the garden edge device of FIG. 1.

Referring now to FIG. 5, there is shown T-joint splice plate 28. T-joint splice plate 28 joins three units of garden edging device 10a into a T-shape in the same manner as that described for splice plates 26, 29 in which the units of edging device are positioned beneath the splice plate, holes 22 are lined up, and stakes are driven into the ground through holes 22. Additionally, splice plates 27, 28, 29, as well as units of garden edging device 10a, may all have the same cross-sectional dimensions and may be provided with male and female coupling means such as flanges for a coupling units of edging device 10a to splice plates 26, 28, 29.

Figure 6:
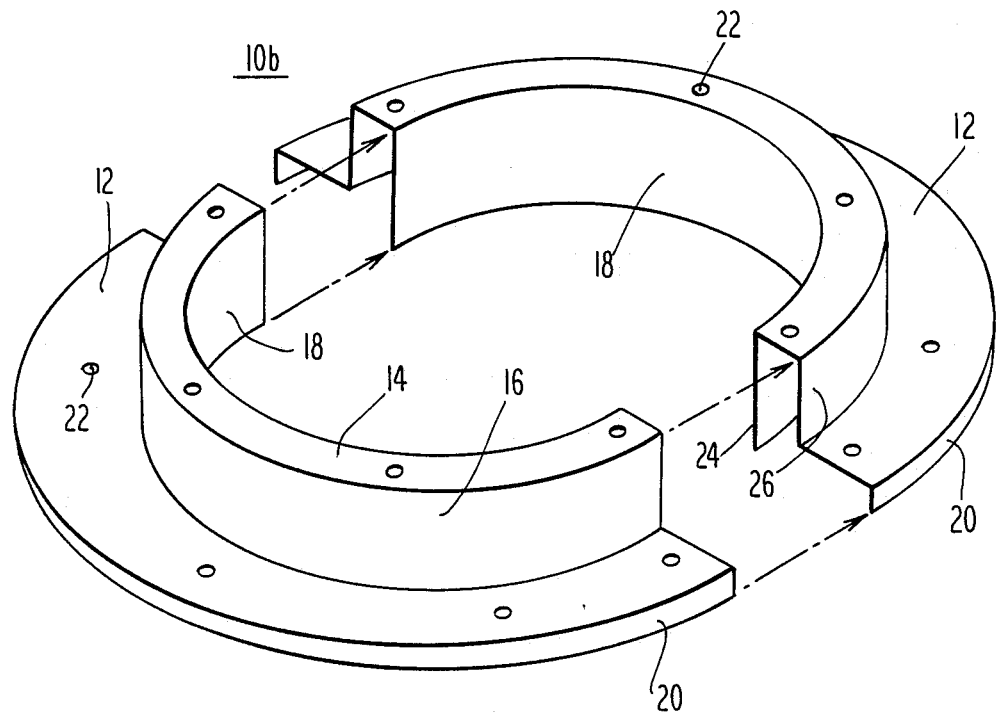
FIG. 6 shows a perspective view of arcuate units of the garden edging device of the present invention.

Referring now to FIG. 6, there is shown garden edging device 10b. Garden edging device 10b is an alternate embodiment of garden edging device 10a wherein, rather than having straight longitudinal dimensions, all the segments are formed into arcuate shapes. Garden edging device 10b may be thus formed into an arc of any number of degrees or into an S-curve of any number of degrees although the illustration shows two such units formed at plus and minus one hundred eighty degrees. Garden edging device 10b may also be formed straight along one or more portions of its length while being curved at another portion or portions.

Garden edging device 10b is useful for forming edging around curved areas such as around trees or around flower beds which do not have straight borders. One unit of garden edging device 10b may be joined to another unit of garden edging device 10b or to a unit of garden edging device 10a. Additionally, joining of garden edging device 10b may be by either male/female coupling flanges at their ends or by splice plates 26, 28, 29 as previously described.

Figure 7:
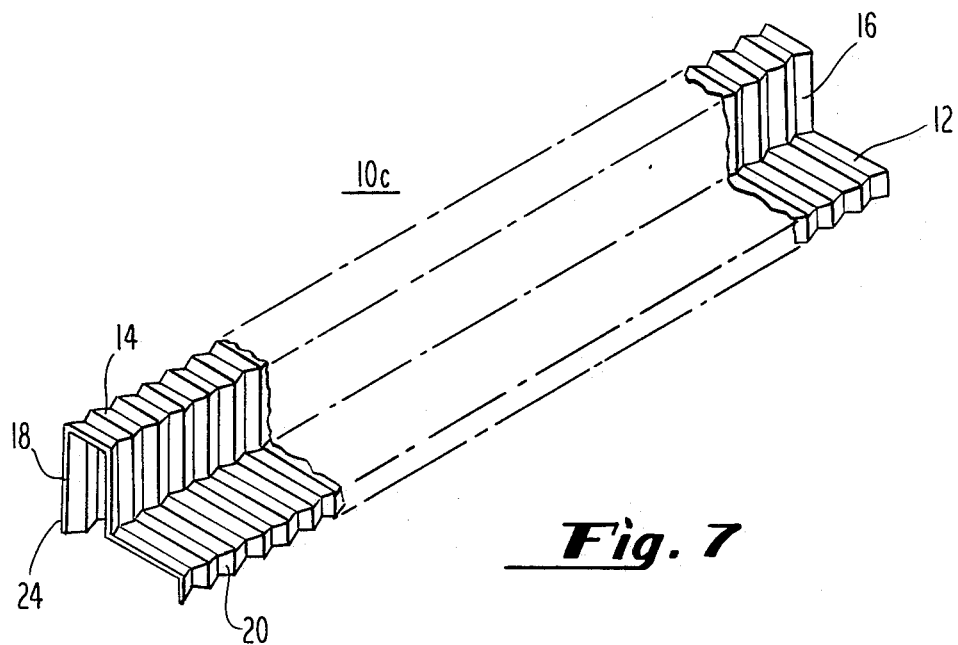
FIG. 7 shows a perspective view of an alternate embodiment of the garden edging device of FIG. 1 wherein transverse folds along the length of the edging device provide flexibility to permit bending of the edging device.

Referring now to FIG. 7, there is shown garden edging device 10c. The cross-sectional shape of garden edging device 10c is substantially the same as garden edging devices 10a, 10b wherein vertical segments 16, 18 depend downwardly from upwardly facing surface 20 and vertical segment 20 depends downwardly from upwardly facing surface 12. However, all surfaces 12, 14, 16, 18, 20 of garden edging device 10c are formed with a plurality of folds to form accordion like surfaces which permit garden edging device 10c to be bent into any desired shape. The accordian-like folds may cover the entire length of garden edging device 10c or any portion of edging device 10c. Thus, garden edging device 10c may be bent into a ninety degree angle or into an S curve or any other curvilinear shape.

Additionally, portions of garden edging device 10c may be formed with accordion-like folds while other portions may formed as straight and curved portions as described for garden edging devices 10a, 10b. A plurality of holes 22 can be provided in garden edging device 10c in order to more firmly secure garden edging device 10c to the ground, to other units of garden edging device 10c, to units of garden edging devices 10a, 10b and to splice plates 26, 28, 29 as previously described. Ends caps (not shown) may be used to cap the end of a unit of garden edging device 10a,10b,10c if the end is not spliced to another unit or to a splice plate.

Garden edging devices 10a,10b,10c may be provided with holes (not shown) in segments 12,14,16,18,20 for the passage of water for watering lawns or gardens. Additionally, the flat surfaces of the barrier facilitate the disposing of sprinkler equipment within the barrier formed by the segments of devices 10a,10b,10c.

I claim:

1. A garden edging device for separating one area of a lawn from another, comprising;
   a wall member comprising a first generally flat surface having first longitudinal edges and raised above ground level by two vertical wall segments depending downwardly from said first longitudinal edges, a longer one of said vertical wall segments extending farther downward than a shorter one of said vertical wall segments such that the portion of said longer wall segment which extends below said shorter wall segment may be buried in the ground as a first anchor member;
   a border member comprising a second generally flat surface having second longitudinal edges, said second generally flat surface being connected at one of said second longitudinal edges to the lower edge of said shorter vertical wall segment such that said second general flat surface extends along ground level;
   a second anchor member extending downwardly from one of said second longitudinal edges of the second generally flat surface, opposite said shorter vertical wall segment, to be buried in the ground;
   at least one longitudinal segment of said device having the wall member, said border member and said anchor members made of flexible material having accordion-like folds in said first and second generally flat surfaces and in said two vertical wall segments, said folds extending across the longitudinal axis of said device, wherein the device may be bent into curves along said segment having the folds; and
   means for connecting said device to another like device to form a chain of said devices to edge a garden.

2. A garden edging device as in claim 1, wherein said at least one longitudinal segment having the wall member, the border member and anchor member made of flexible material having accordian-like folds across its longitudinal axis extends the entire longitudinal length of said device.

* * * * *